United States Patent [19]

Lincoln

[11] Patent Number: 5,797,641
[45] Date of Patent: Aug. 25, 1998

[54] X-10 DOE-RACK TRAILER

[76] Inventor: Michael H. Lincoln, 821 Jubal Way, Frederick, Md. 21701

[21] Appl. No.: 651,566

[22] Filed: May 22, 1996

[51] Int. Cl.⁶ ........................................................ B60P 3/00
[52] U.S. Cl. ........................................ 296/3; 296/26
[58] Field of Search .................. 296/3, 181, 26

[56] References Cited

U.S. PATENT DOCUMENTS

| | | | |
|---|---|---|---|
| 3,917,316 | 11/1975 | Furnish | 296/26 X |
| 4,439,087 | 3/1984 | Schink | 296/3 X |
| 4,932,703 | 6/1990 | Chamberlin et al. | 296/26 |
| 5,120,102 | 6/1992 | Cumbie | 296/26 X |
| 5,533,771 | 7/1996 | Taylor et al. | 296/26 |
| 5,553,762 | 9/1996 | Brown | 296/3 X |

*Primary Examiner*—Joseph D. Pape
*Attorney, Agent, or Firm*—Robert Halper

[57] ABSTRACT

A rack for carrying loads and mounted over the bed of a vehicle and adapted to be converted to a trailer, the rack having front and rear tubular vertical posts supporting an assembly of tubular bars, the tubular bars being divided into front and rear segments and each segment having a cover of steel wire mesh, the front segment being folded over the rear segment after detaching the front segment from the front vertical posts, pivoting the rear and folded over front segments to a vertical position so as to lie adjacent the rear vertical posts, the rear vertical posts carrying telescopic members to which the rear segments are attached having an axle and journaled wheels passing through standards welded to the back side of the rear posts, pivoting the whole assembly to a horizontal position, with the folded over segments overlying the rear posts, extending the telescopic members with the attached rear segment, unfolding the front segment so that the front segment is maintained forwardly of the rear segment. A system for establishing a torque necessary for translation of the posts, with wheels and the combined segments is also effectuated. Additional support posts can be placed under the rack in the region of the front segment with angularly inclined appendages extending therefrom to support ladders and the like.

9 Claims, 2 Drawing Sheets

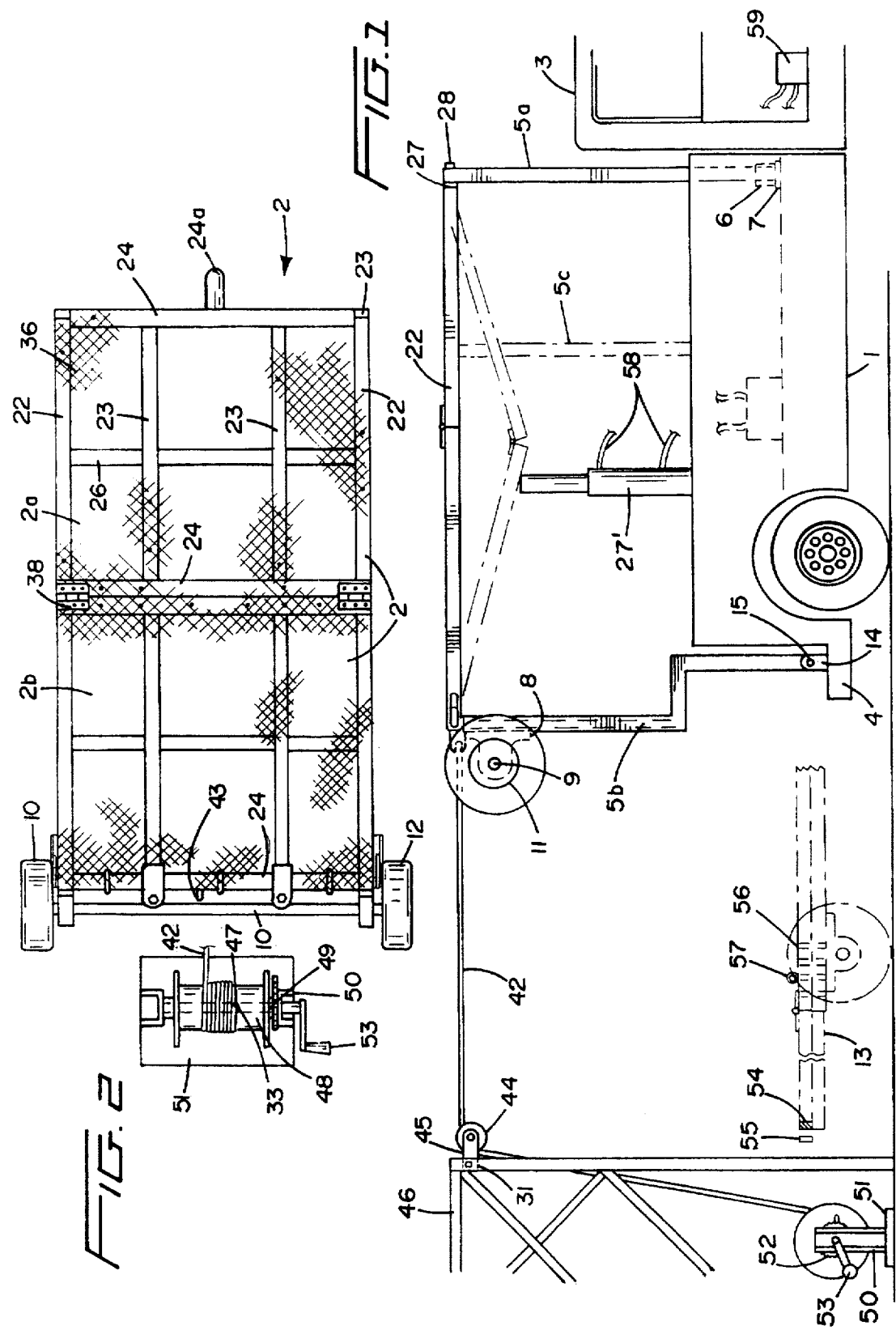

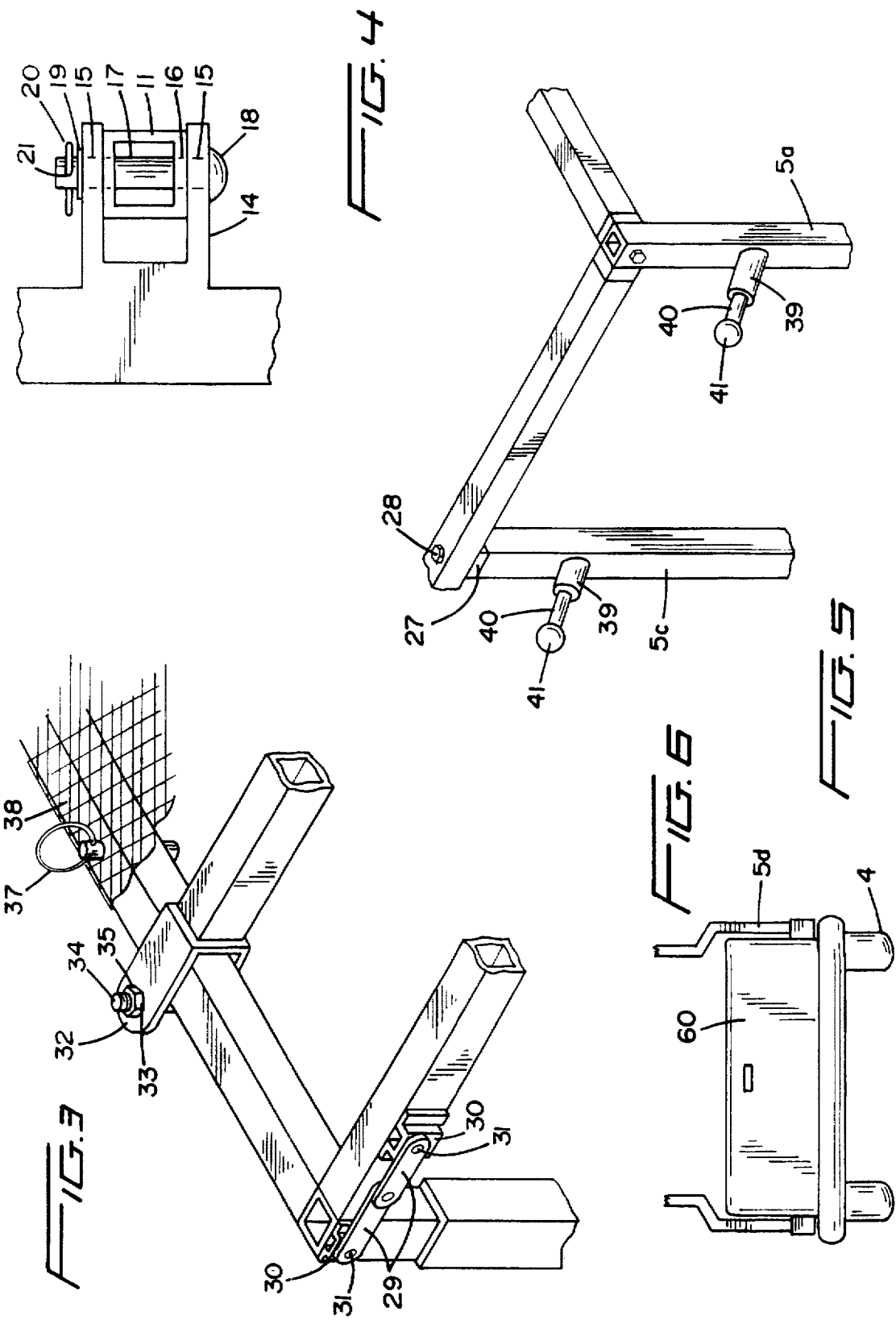

X-10 DOE-RACK TRAILER

FIELD OF INVENTION

This invention relates to cargo racks for trucks, campers and the like, wherein the rack is convertible to a trailer.

BACKGROUND OF THE INVENTION

The art discloses a number of racks for vehicles as well as various type of hitches for trailers. There are collapsible racks, retractible racks, extensible trailers and piggyback trailers as shown by the illustrated patents.

U.S. Pat. No. 2,539,733 describes a motor vehicle with a tandem conversion attachment. The tandem conversion unit comprises a frame with a plurality of corner posts. Attached to the frame are a pair of hangers for another set of wheels. A flexible connection is maintained between the truck and tandem by a cross-shaped shaft. The wheels of the tandem portion can be raised out of contact with the road surface so that the vehicle can travel without a load and with the tandem portion supported entirely by the truck.

U.S. Pat. No. 3,239,237 is an example of a retractable logging trailer unloading strap having a traction section and trailer section. The traction section includes front wheels and two pairs of rear driving wheels. The trailer section includes a boom having an eye at the forward end that engages a hook on the rear of the tractor. Instead of having a trailer section behind the tractor at all times, the trailer may be carried piggy back fashion at the rear end of the tractor. Upright saddle arms on the tractor embrace the rear portion of the trailer section. A fluid motor connected to a strap enables lifting of the trailer to and from the tractor.

U.S. Pat. No. 4,058,281 shows a carrying rack for trucks. The rack extends from over the cab of the truck to its end. It is readily detachable and foldable by pivoting the support legs against the framework of the rack. Articles can be carried on the rectangular framework of the rack above the bed and cab of the truck.

U.S. Pat. No. 4,496,166 depicts another trailer for hauling logs wherein there is a load bed with two pairs of log retaining stakes and a pair of rear driving wheels. Mounted on the rear of the load bed is a hydraulic standard capacity log loader having a mast on the top of which is a hydraulically operated boom arm with a claw for carrying logs The trailer is made of two members which are nested so as to be carried on the bed. The forward portion of the trailer sits over the rear portion when being carried by the bed. In operational mode the two trailer segments are joined together and then attached to the rear of the bed by a hitch.

U.S. Pat. No. 5,009,457 pertains to a pick-up truck with a load bearing cover and rack. The rack is sectioned longitudinally and can be opened, thus extending the height of the side walls so that oversize or bulk items can be carried or the cover can be closed to increase the load carrying capacity. The cover is made of steel mesh.

U.S. Pat. No. 5,110,149 is illustrative of another trailer system for enhanced load carrying capacity by using primary and secondary trailers. An adjustable hitch assembly is included on the truck to allow the trailer system to be coupled and uncoupled from the truck regardless of terrain conditions. The primary trailer has a bed that can pivot about a horizontal bar that secures the trailer to the primary trailer support. The auxiliary trailer is secured by pins and plates to the primary trailer. The trailer can be hydraulically elevated to the bed of the truck when not in use.

U.S. Pat. No. 5,152,570 teaches a retractable cargo rack. The rack extends over the rack to the end of the truck. Collapsible posts support a pair of longitudinally extending rails which are telescoped and are extensible when the posts swing toward their vertical position.

From a view of the cited art, it is clear that a vehicle that is adapted to carry a load carrying rack or be converted to a trailer would be very advantageous.

It is an object of this invention to produce a rack for supporting loads on motor vehicles which can be readily converted to a trailer.

It is a further object of this invention to produce a rack trailer assembly which is adaptable to a variety of motor vehicles.

It is still an object of this invention to design a support rack that can be quickly converted to a trailer without great expense and with ease.

SUMMARY OF THE INVENTION

The invention consists of a load carrying rack divided into two equally sized front and rear segments. The segments include end bars, transverse and longitudinal support bars, the whole covered by a steel wire mesh and supported by a plurality of tubular vertical posts. The rear posts have an axle extending transversely therethrough on which are mounted two wheels. The rear posts carry telescopic members and are pivotally supported on a bumper attached at the rear of the motor vehicle. Similarly, the rear segments are respectively pivotally connected to the rear posts and rear transverse bars and the front segments are hinged to the rear segments. The rack can be converted to a trailer by first allowing the front segments to swing over the rear segments and then pivoting both segments to be positioned vertically adjacent the side of the rear posts facing toward the front of the vehicle. Finally the rear posts with the combined segments are pivoted so the rear posts are positioned horizontally and outward from the rear of the truck with the wheels on the ground surface and the respective rack segments directly over the rear posts. The telescopic members with the rear segment attached thereto are extended outwardly from the rear of the vehicle and the front segment unfolded so that the front and rear segments are respectively positioned directly over the rear posts and the telescopic members.

BRIEF DESCRIPTION OF THE DRAWINGS

FIG. 1 is a front view of the vehicle showing a rack over the bed of the vehicle and in phantom lines the conversion of the rack to a trailer and accessories necessary for the conversion.

FIG. 2 is a plan view of the rack trailer.

FIG. 3 is an enlarged view showing the pivotal connection of the rear longitudinal end bars to the rear posts and the pivotal connections of the intermediate longitudinal bars to the rear transverse member.

FIG. 4 is an enlarged view showing the pivotal connection of the rear posts to the end of the vehicle.

FIG. 5 is a partial end view showing a modification of the position of the rear posts of FIG. 1.

DETAILED DESCRIPTION OF THE INVENTION

FIG. 1 illustrates, for example, a truck I containing a carrying rack 2 extending from behind the cab 3 to the rear of the truck aligned with a bumper 4. The rack is divided into a front segment 2a and a rear segment 2b and is supported by 4 vertical tubular posts 5a, 5b. The posts 5a extend from the bed of the truck and fit into shoes 6 welded to pads 7 that are bolted to the bed of the truck. Tubular posts 5b are sectioned so as to extend vertically downward for a distance that will be about equal to the length of the segments and slightly above the height of the truck body. The posts then are bent horizontally for a short distance and then continue vertically to the bumper where they are pivotally fastened as explained below. Standards 8 having central apertures 9 are welded near the tops of the rear posts at the outer side with respect to the end of the truck. An axle 10 extends transversely through the standards and bearings 11 receive the axle whose ends are journaled in wheels 12. The rear posts carry telescopic members 13 and this assembly of post and telescopic member assembly is pivotally connected to a stub 14 that is welded to and projects upwardly from the bumper. The telescopic members project upwardly so as to be in the same plane as the front vertical posts. FIG. 4 shows the pivotal fastening of the post 5b to stub 14. The stub has a bore 15 and the tubular post has a perforation 16 aligned with the bore and a pin 17 with enlarged head 18 secures the post to the stub. At the end of the pin passing through the post and stub is a washer 19 to limit axial movement of the pin and a resilient clip 20 that passes through an aperture 21 in the pin. The front segment of the rack comprises two longitudinal end bars 22, two laterally spaced support bars 23 between the end bars and two transverse bars 24. Optionally for greater support an intermediate transverse bar 26 can be welded to the underside of the longitudinal bars. One transverse bar 24 is connected between the front vertical posts and the other transverse bar is located medially of the rack at the other end of the segment. Medially of the front transverse bar an eye 24a is welded for connection to a conventional adjustable hitch 23 of the front segment. The ends of the front segment are welded to both transverse bars and the front end bars 22 are bolted to the vertical posts and welded to the one transverse bar between the posts. At the ends where the end bars are bolted, these end bars have caps 27 with threaded apertures to receive bolts 28 that pass through threaded openings in the posts and transverse bars, the rear segment is composed of the same elements except that the end longitudinal bars are connected by toggles 29 to the telescopic members carried in the rear posts with one toggle joint end fastened to the end longitudinal bar by a flanged U-shaped member 30 welded on the longitudinal bar and a rivet 31 securing the toggle to the U-shaped member, another rivet joins the other end of this toggle joint to another toggle joint whose other end has a similar rivet for fastening the other toggle joint to another flanged U-shaped member mounted on the telescopic member. The rear transverse bar is welded to the telescopic members and the laterally spaced rear longitudinal bars are pivotally connected to the rear transverse bar by U clamps 32 that devolve from the laterally spaced longitudinal bars and embrace the transverse bar with sufficient clearance to permit rotational movement. The ends of the clamps have apertures 33 through which pass bolts 34 secured by nuts 35. A steel wire mesh cover 36 is fastened over each segment. The wire mesh is welded to the longitudinal bars and the transverse bars 24 of the front segment and in the rear segment, the wire mesh is welded to the medial transverse bar associated with the rear segment but is detachably held to the rear transverse bar between the telescopic members by a number of spaced resilient clips 37 that pass through perforations therein. The front segment and rear segment are connected by hinges 38 that are connected at the upperside of each longitudinal end bar. FIG. 5 shows an embodiment wherein two additional vertical support posts 5c can be mounted at some point adjacent the medial transverse bar 24 of the front segment. These posts would be secured to the bed of the truck as heretofore described and would be releasably secured to the end bars by bolts 28 that pass through end caps 27 in the same manner as the front end bars were fastened to the front posts. To one of the front posts 5a and intermediate post 5c there would be welded a small collar 39 inclined upwardly at about 30 degrees. Within the collar is a telescopic member 40 that terminates with a spherical handle 41. These projections from the respective posts serve as anchors for accessories such as one or more ladders. FIG. 6 shows an alternative position for securing the rear vertical posts and is used to obviate interference with the tailgate 60 when turning down the tail gate. As seen in the Figure the lower vertical leg of vertical post 5d is mounted on the end of the bumper 4 beyond the limits of the tail gate. The vertical leg is made shorter and the post inclines inwardly and upwardly till it coincides with the horizontal portion and then follows the course of post 5b.

To convert the rack to a trailer, jacks 27 are placed under the rear longitudinal bars and the bolts connecting the front posts to the front end longitudinal bars are removed and the resilient clips connecting the rear wire mesh to the rear transverse bar are removed. The front rack segment is then hingedly folded over the rear segment and the jacks gradually lowered allowing gravity to pivot the combined segments to a vertical position adjacent the rear posts. The toggle joints are pushed upwardly so that the rear posts with the journaled wheels mounted on the outer side, the telescopic members and rack segments appended thereto, can be readied for rotation to a horizontal position. Steel cables 42 are looped around hooks 43 welded to the medial section of the transverse bar between the rear posts. The cables pass over pulleys 44 aligned with the hooks and fixed to a cross member 45 on a scaffold 46, the scaffold being placed a reasonable distance so as to be clear of the post and the appended racks when the same is rotated to a horizontal position. The cables extend downwardly and their ends are passed through apertures 47 in a shaft 48 journaled in bearings 49 which are connected to channels 50, the channels being mounted to a platform 51. One end of the shaft protrudes through one of the channels and contains a pawl and ratchet mechanism 52 and a crank 53 at the end. As the crank is rotated a torque is created which will pull the posts into a horizontal position with the rack sections overlying the posts and the telescopic members, the pawl and ratchet assisting in aiding the posts, telescopic members, accompanying rack and welded members with wheels to have a soft landing. The rack segments will then overlie the rear posts and the telescopic members. The telescopic members with the attached rear segment will then be withdrawn to extend rearwardly of the rear wheels. To aid in withdrawal of the telescopic members, a metal disk 54, is welded at the end of the member and a matching ceramic magnet 55 can be used. Magnets can be parked conveniently on one of the truck sides when not in use. To prevent the telescopic members from slipping out of the posts, several spaced perforations 56 are drilled in both the posts and the corresponding telescopic members. After withdrawal of the telescopic member to the desired position, a pin 57 will be inserted through the perforations. The front rack segment will then be unfolded so that this segment maintains its same relative position, that is, forwardly of the rear rack segment. The resilient clips will then be replaced to fasten the rear screen mesh to the rear transverse bar. The jacks could be manually or hydraulically operated. If hydraulically operated, the jacks could be mounted at selected points in the rear bed of the truck.

Hydraulic lines 58 connected to a reservoir 59 could be used to activate or deactivate the jacks. A number of alternatives might also be adapted to the above described embodiments. For example, the rack could be extended above the cab. The rear posts when used as a support for a trailer could be attached to the underside of the vehicle rather than at the bumper. Instead of a truck, the rack segments could be mounted on the roof of a van. Fastened to the underside of the rack segments at the peripheral edges to prevent marring the root, would be a plurality of suction cups to fasten the racks to the roof. The rack segments could be joined by a hinge, folded in back of the rear posts and a boom with an electromagnet suspended from cables could be used to rotate the posts and sections from a vertical to horizontal position.

As shown by the description directly above various changes and modifications could be made to the described embodiment without departing from the spirit and scope of the invention.

I claim:

1. A rack for carrying loads above the bed of a vehicle, said rack being convertible to a trailer comprising:

a) a pair of front vertical posts and a pair of rear vertical posts having tops, standards welded to an upper end of said rear posts at a far side thereof with respect to the rear of said vehicle, an axle running transversely through an aperture of said standards and extending outwardly beyond said rear posts, bearings for receiving said axle, said bearings being journaled in a pair of wheels, each said rear post carrying a telescopic member extending substantially the length of said rear post, said telescopic members having upper ends that are in the same horizontal plane as said front posts, b) said rack having a front segment and a rear segment, each segment having a plurality of tubular bars that include a pair of end longitudinal bars having upper surfaces positioned between said tops of said posts, a pair of longitudinally spaced bars therebetween, front and rear trans verse bars between said posts, a transverse bar for each said front rack and rear rack segment medially of each said rack, said end longitudinal bars of said front segment having means for detachably connecting said bars to said posts, said longitudinal bars of said front segment being welded to said medial transverse bar for said front rack segment, said longitudinal bars of said rear segment being welded to said medial transverse bar for said rear rack segment, said rear transverse bar being welded to said rear vertical posts, said rear rack segment being fastened to said telescopic members, c) a first steel wire mesh welded over said front segment along said longitudinal bars and said transverse bars, means for detachably securing a second steel wire mesh to said transverse bar adjacent said rear post, each segment with said first and second wire mesh being connected by hinges placed on said upper surfaces of said front and rear longitudinal end bars located between said posts, such that said front segment can be folded over said rear segment, d) means pivotally mounting said rear segment and said folded over front segment with respect to said rear vertical posts, a pair of jacks placed under said rear segment and folded over front segment to allow a controlled pivot movement, said segments moving to a vertical position inwardly of and adjacent said rear vertical rear posts, e) means for pivotally mounting said rear vertical posts so that said rear posts with said telescopic members, its axle and attached wheels ans accompanying front and rear segments are translated from a vertical position to a horizontal position, f) said rear posts, wheels mounted thereto and said telescopic members being in ground position after said pivoting, said rack segments overlying said rear posts, means for extending said telescopic members and said attached rear rack segment rearwardly from said rear posts, said front rack segment being unfolded so that said front rack segment is positioned forwardly of said rear segment, said telescopic members and said rear posts having spaced apertures and pins inserted through corresponding apertures to secure said telescopic members to said posts.

2. A rack as in claim 1 wherein said means for extending said telescopic members comprises a pair of disk shaped ceramic magnets with corresponding disks welded within the outer ends of said telescopic members.

3. A rack as in claim 1 wherein the means for detachably securing the wire mesh of said rear segment from said rear transverse bar includes a plurality of spaced resilient clips inserted through the mesh and through a series of perforations in said rear transverse bar, said perforations being aligned with said clips.

4. A rack as in claim 3 wherein said means for pivotally mounting said rear segment and said folded over front segment includes toggle joints connected to said rear longitudinal end bar and to said telescopic member, a bracket and a rivet on said telescopic member and said longitudinal bar for connecting one end of the toggle joints and another pivotal end of said joints connected by a rivet, said laterally spaced rear longitudinal bars devolving into U clamps, said clamps fitting snugly over said rear transverse bar with sufficient clearance to permit rotational movement of said rear laterally spaced longitudinal bars, said clamps having apertures and bolts passing through said apertures secured by nuts.

5. A rack as in claim 4 wherein said means for pivotally translating said rear vertical post and telescopic members, said accompanying rear segment and said folded over front segment comprises a rear bumper, stubs welded to the rear bumper and extending upwardly therefrom, said stubs having bores, said rear posts having apertures in alignment with said bores and pins with enlarged heads extending through said short vertical legs and said bores, washers over said pins, said pins having resilient clips, said clips engaging holes in said pins.

6. A rack as in claim 5 wherein establishment of sufficient torque to rotate said vertical posts, said telescopic members and said accompanying front and rear segments and said welded standards with axle and journaled wheels is effectuated by hooks welded and spaced in a medial region of said rear transverse bar, cables looped over said hooks and passing around a pulley mounted on a crossbar of a scaffold placed a sufficient distance from the vertical posts to be rotated, said cables descending and having ends passing through apertures in a shaft having bearings connected to channels mounted on a platform, one end of said shaft passing through one of said channels having a pawl and ratchet and a crank, said pawl and ratched enabling said vertical posts, said wheels and said combined front and rear segments to achieve a soft landing when rotated to a horizontal position.

7. A rack as in claim 1 wherein said rear vertical posts are segmented such that a first segment extends vertically to a distance slightly above a tail gate of said vehicle and outwardly therefrom, a second segment extends horizontally to a position over said bumper and a third segment extends vertically downward for pivotal attachment to said bumper.

8. A rack as in claim 7 wherein after said horizontal second segment, said post inclines outwardly to a distance such that when it joins said third segment, said third segment is pivotally attached to said bumper at a point beyond the region of said tailgate.

9. A rack as in claim 1 wherein two additional vertical posts extending from the bed of the vehicle to beneath the rack are placed in the region of the front segment adjacent said hinges, a welded collar extending upwardly and angularly from one of said additional vertical posts and from one of said front vertical posts, and a telescoped member with spherical handle fitted in said collar.

* * * * *